(12) United States Patent
Böge (10) Patent No.: US 6,523,268 B1
(45) Date of Patent: Feb. 25, 2003

(54) ANGULAR ENCODER

(75) Inventor: Ludwig Böge, Jenapriessnitz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/710,457

(22) Filed: Nov. 10, 2000

(30) Foreign Application Priority Data

Nov. 12, 1999 (DE) .......................... 199 56 833

(51) Int. Cl.$^7$ .............................. G01B 5/24; G01B 7/30
(52) U.S. Cl. ........................................ 33/1 PT; 33/1 N
(58) Field of Search .............................. 33/1 PT, 1 N, 33/534, 755, 758, 614, 616, 618, 555.1, 555.4; 101/415.1; 24/457

(56) References Cited

U.S. PATENT DOCUMENTS

| | | | | |
|---|---|---|---|---|
| 3,750,571 A | * | 8/1973 | Germann | 101/415.1 |
| 4,688,484 A | * | 8/1987 | Herold et al. | 101/415.1 |
| 4,809,607 A | * | 3/1989 | Dorow et al. | 101/415.1 |
| 4,920,659 A | * | 5/1990 | Becher | 33/555.4 |
| 4,938,135 A | * | 7/1990 | Wieland | 101/415.1 |
| 4,977,833 A | * | 12/1990 | Inage et al. | 101/415.1 |
| 5,186,108 A | * | 2/1993 | Hillebrand | 101/415.1 |
| 5,337,486 A | * | 8/1994 | Brechtel | 33/617 |
| 5,979,238 A | * | 11/1999 | Boege et al. | 33/755 |
| 6,003,442 A | * | 12/1999 | Solomon et al. | 101/415.1 |
| 6,098,295 A | * | 8/2000 | Feichtinger | 33/1 PT |

FOREIGN PATENT DOCUMENTS

| | | |
|---|---|---|
| DE | 0272698 | 10/1989 |
| DE | 9611983 | 7/1997 |
| DE | 9751019 | 6/1999 |
| JP | 06219603 A * | 9/1994 ............... 33/555.1 |

OTHER PUBLICATIONS

Alsons Ernst "Digital Längen–und Winkelmesstechmick", Modern Industrie, 1998, pp. 69–70.

* cited by examiner

Primary Examiner—Diego Gutierrez
Assistant Examiner—Mirellys Jagan
(74) Attorney, Agent, or Firm—Sildey Austin Brown & Wood, LLP (57) ABSTRACT

An angular encoder including a tensible tape scale having a scannable graduation and designed for taking circular angular measurements; and a tensioning device connected with one or both ends of the tape scale for tensioning the tape scale to adjustably position the one or both ends and having an actuation member, and a transmission mechanism for connecting the actuation member with one or both end(s) of the tape scale so that displacement of the actuation member results in a predetermined change of a position of the one or both ends of the tape scale determined by a transmission ratio of the transmission mechanism.

30 Claims, 6 Drawing Sheets

ANGULAR ENCODER

BACKGROUND OF THE INVENTION

1. Field of the Invention

The present invention relates to an angular encoder including a tensible tape scale having a scannable graduation and designed for taking circular angular measurements, and a tensioning device connected with at least one end of the tape scale for tensioning the tape scale to adjustably position the at least one end.

2. Description of the Prior Art

Systems of the above-described type are used, in particular, for taking angular measurements when large round tables are used, with the tensible tape scale being wound around the table circumference, and with the tensioning device being connected with both ends of the tape scale for tensioning the tape scale.

The exact positioning of the ends of the tape scale with tensioning device is very important because the ends represent an unstable point of the angular encoder. In order to achieve an adequately large angle resolution, the length of the grating period (i.e., in case of a periodical line graduation, the distance between adjacent lines defining the grating period) is usually several units of 10 μm. The positioning of the tape scale ends should be effected with a precision in the above range, i.e., within several units of 10 μm, in order to be able to achieve the angle resolution defined by the grating period of the tape scale.

The reference book of Alfons Ernst, "Digitale Langen- und Winkelmesstechmik" (Digital Linear and Angular Measurement Technology), Landsberg/Lech: Publishing House "Modem Industry," Third Edition (1998), p.p. 69/70, discloses tensioning of the tape scale ends with a turnbuckle having two shoes that provide for butt-joining of the two ends in the tensioned condition of the tape.

The German Publication 272 698A1 discloses an angular encoder with a steel tape scale the operational length of which extends only over a half of the circumference of the round table and has, at its both ends, extension members that are mounted on another half of the table and that provide for tensioning of the tape scale with tensioning elements. In the disclosed embodiment, the two ends do not form a butt-joint but rather form a gap therebetween. For scanning the steel tape scale, the angular encoder has two scanning heads arranged diametrically opposite each other and of which one head is always at the same half of the round table on which the tape scale is mounted.

An object of the present invention is to provide an angular encoder of the type described above which would insure a highly precise positioning of the tape scale ends with simple means.

SUMMARY OF THE INVENTION

The objects of the present invention, which will become apparent hereinafter, are achieved by providing a tensioning device connected with one or both ends of the tape scale for tensioning the tape scale to adjustably position the one or both ends, with the tensioning device including an actuation member, and a transmission mechanism for connecting the actuation member with the one or both ends of the tape scale so that the operation of the actuation member would result in a predetermined change of a position of the one or both ends of the tape scale which position change is determined by a transmission ratio of the mechanism.

The advantage of the present invention consists in that the transmission mechanism converts the movement of the actuation member of the tensioning device, which can be effected with a suitable tool engageable with the actuation member, in a much shorter movement of the end(s) of the tape scale. A simple mechanical mechanism permits to achieve a transmission ratio of 1:1000 as it will be explained in detail further below. The present invention permits to achieve the described adjustment precision of positioning of the tape scale ends, without the need for both the actuation member and the actuating tool to meet high precision requirements.

In accordance with a preferred embodiment of the present invention, the actuation member is connected, via the transmission mechanism, with both ends of the tape scale. In this case, a symmetrical positioning of both tape scale ends can be effected with the actuation member.

According to the present invention, the transmission mechanism contains a lever mechanism including a lever having a first arm associated with the actuation member, and a second arm associated with at least one end of the tape scale and having a length shorter than a length of the first arm, with the lever being pivotal about a turning knuckle or a flector.

The transmission mechanism includes two levers for connecting the actuation member with both tape scale ends, then, preferably, they are connected with a yoke provided, respectively, with two hinges about which the levers can pivot. When the hinges are formed as flectors, they can be integrated into the yoke so that the yoke, the hinges and the levers form a one-piece unit.

Alternatively, the two levers can be formed as separate components forming together a unit only upon mounting of the angular encoder. When it is advantageous to form the transmission mechanism as a one-part unit or a multi-part unit depends on a particular case, i.e., on a structural relationship of the particular system. E.g., it can depend on whether the axle of the round table, about the circumference of which the tape scale has to be put, has a free end so that the tape scale, together with the scanning device can be axially pushed thereon. In this case, the tensioning device is advantageously formed as a one-piece unit. In case, when there is no free end of the table axle available and, therefore, the tape scale with the tensioning device cannot be pushed thereover on the round table, preferably, the tensioning device is formed of several parts. The tensioning device, in this case, is formed into unit only after the tape scale has been mounted around the circumference of a round table.

According to the present invention, the transmission mechanism includes a force deflection element acted upon by an actuation member displaceable in a first direction and causing thereby a displacement of the force deflection element in a second direction extending at angle or transverse to the first direction, with the displacement of the force deflection element resulting in a change of position of at least one end of the tape scale. The force deflection element is connectable with one or both ends of the tape scale by one or two links, respectively, with the link(s) being formed by a lever(s) of a type discussed above.

Preferably, the force deflection element itself contributes to the required transmission ratio by being formed so that its displacement in a direction transverse to the operational direction of the actuation member is much shorter than the displacement of the actuation member acting on the force deflection element.

The force deflection element can be formed, e.g., as a wedge element operationally connectable with the actuation member. Alternatively, the force deflection element can comprise a deformable member connected with the actuation member and deformable in a direction transverse to the displacement direction of the actuation member.

The actuation member can be formed, e.g., as an eccentric or as a longitudinally displaceable member, in particular, as an adjusting screw.

The tensioning device according to the present invention can be used with both angular encoders with which both ends of the tape scale are butt-joined by the tensioning device, and angular encoders with which a gap remains between the tape scale ends. In the last case, the solution according to the present invention is particularly advantageous, as it permits to exactly adjust the distance between the two ends of the tape scale.

The tensioning device is advantageously so formed that it can be positioned in a recess formed in a round table about which the tape scale is placed. Further, the tensioning device has one or several support elements with which the tensioning device is supportable against support surfaces formed in the recess.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 6b a perspective view at an increased scale of a detail of the device shown in FIG. 6a;

DETAILED DESCRIPTION OF THE PREFERRED EMBODIMENTS

Figures 1A, 1B, 1C:
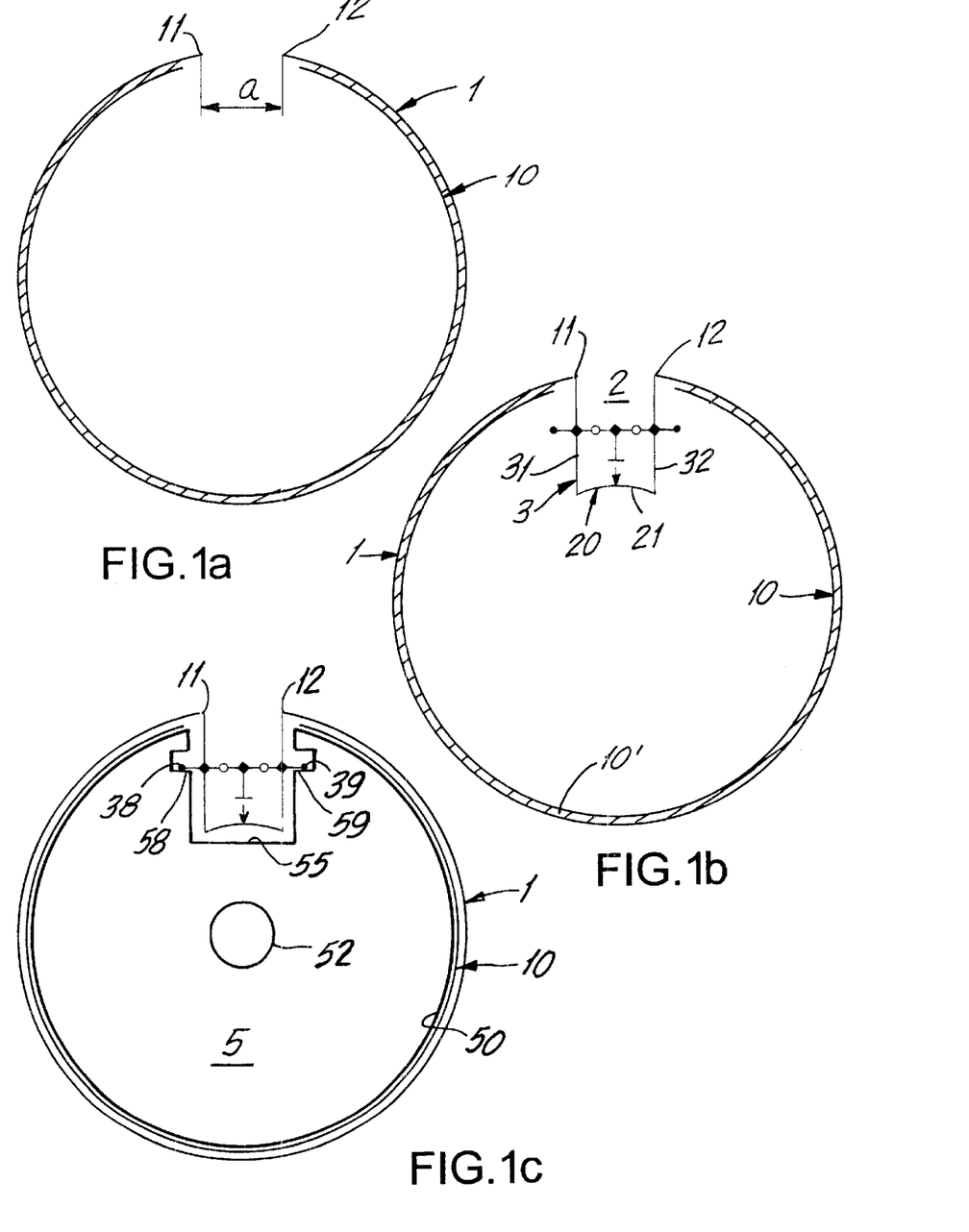
FIG. 1a a plan view of a taut tape for an angular encoder according to the present invention.
FIG. 1b a plan view of the taut tape shown in FIG. 1 with a tensioning device secured thereto.
FIG. 1c a plan view of the taut tape and the associated tensioning device according to FIG. 1b secured to a round table.

FIGS. 1a–1c show a tensible tape scale 1, e.g., a steel tape scale that can be fitted on an outer circumference of a round table to provide an angular encoder for the round table. The tape scale 1 is mounted on a flexible, circular base tape 10 adapted to be fitted about a round table. Between the tape scale 1 and the base tape 10, there is provided a slide or decoupling layer, e.g., an oil layer 10' to provide for as frictionless sliding of the tape scale 1 on the base plate 10 as possible. The oil layer holds the scale tape 1 on the base tape 10 by adhesive forces.

Alternatively, the tape scale can be fitted directly about an outer circumference of a round table (i.e., on a rigid base body) that, to this end, can be provided with a suitable circumferential groove. In this case, a slide or a decoupling layer should be formed on the outer circumference of the round table before fitting the tape scale thereon. This involves an additional step for mounting a tape scale on a round table which is not needed when the tape scale is mounted on the base tape.

The tape scale 1 is provided on its outer circumference with an optically scannable graduation. Thus, the circular mounting of the tape scale 1 on the base tape 10 provides for an angular measurement by scanning the graduation with a suitable scanning device. The length of the tape scale 1 is so selected that the ends 11, 12 of the tape scale 1 are spaced by a distance a when the tape scale 1, together with the base tape 10, is mounted about a round table.

As shown in FIG. 1b, both ends 11, 12 of the tape scale 1 (but not the ends of the base tape 10) are connected with a tensioning device 2 formed as a turnbuckle. The tensioning device 2 insures an exact positioning of both ends 11, 12 of the tape scale 1 by tensioning the scale 1, without acting on the base tape 10. According to the present invention, the tensioning device 2 has a transmission mechanism 3 including a force deflection element 20 formed as a deformable member 21, and two levers 31, 32 having one of their ends connected with a respective end 11, 12 of the tape scale, and another one of the opposite ends of the deformable member 21. The respective ends of the levers 31, 32 can be connected with respective ends 11, 12 of the tape scale 1 by welding or be screwed therewith. Further details of the construction of the tensioning device 2, in particular the construction and operation of the transmission mechanism 3 will be discussed further below with reference to FIGS. 3–6.

From the point of view of its operation, the tensioning device 2 is characterized in that it adjusts the position of the opposite ends 11, 12 of the tape scale 1 by operating the transmission mechanism 3 with an actuation member 41. By a selection of an adequately high transmission ratio (in this case a so-called "reduction"), a very high precision of the position adjustment of the ends 11, 12 of the tape scale 1 and, thus, of the distance a between the ends 11, 12 is achieved.

Figure 2:
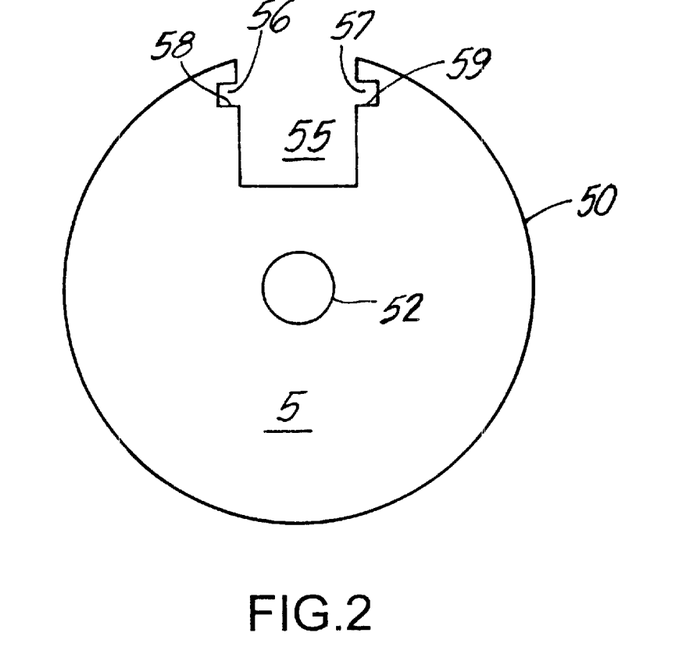
FIG. 2 a plan view of the round table shown in FIG. 1c at an increased scale.

After the connection of the tape scale 1 with the tensioning device 2, they together are mounted on the outer surface 50 of the round table 5 shown in FIG. 2.

The round table 5 has a central bore 52, which serves for mounting of other functional groups on the round table 5, and a recess 55 provided in its circumference for receiving the tensioning device 2. The recess 55 is provided with two side pockets 56, 57 into which the respective support elements 38, 39 of the tensioning device 2 extend and are supported therein against support surfaces 58, 59, respectively.

Below, the construction and operation of the tensioning device 2 will be described in detail with reference to the schematic view shown in FIG. 3.

The tensioning device 2 includes, as mentioned above, a longitudinally displaceable actuation member 41 formed, e.g., as an adjusting screw, and acting on the deformable member 21, which is formed as a flat, bulging, elastically deformable member (e.g., as a leaf spring), with a force F. The opposite ends 22, 23 of the deformable member 21 are integrally connected with respective ends 31a, 32a of the levers 31,32. The opposite ends 31*b*, 32*b* of the levers 31, 32 are connected (as shown in FIGS. 1*b*, 1*c*) with respective ends 11, 12 of the tape scale 1.

The lever 31, 32 pivot about hinges 36, 37 and form thereat a first lever arm 33 associated with the deformable member 21 (and, thus, with the actuation member 41), and a second lever arm 34 associated with a respective ends, 11, 12 of tape scale 1. In order to achieve a desired transmission, the second lever arms 34 of the levers 31, 32 are formed shorter than the first lever arms 33.

Both hinges 36, 37 are integrated in a yoke 35 which extends between the levers 31, 32, connecting them with each other. The yoke 35 also supports the actuation member 41. When the actuation member 41 is formed, e.g., as an adjusting screw, the screw can be arranged in a threaded bore formed in the yoke 35.

Thus, the yoke 35 forms a core of the tensioning device 2 which supports, on one hand, the actuation member 41 and, on the other hand, via the hinges 36, 37, both levers 31, 32. The entire tensioning device 2 is supported with its support elements 38, 39, in the pockets 56, 57 of the recess 55 formed in the table 5, with the support elements 38, 39 abutting the support surfaces 58, 59 of the pockets 56, 57 respectively.

According to an advantageous embodiment of the present invention, the hinges 36 and 37 are formed as flectors and are formed integrally with the yoke 35. When, in addition, the support elements 38, 39 are formed integrally with respective levers 31, 32, the entire tensioning device (except the actuation member 41), which essentially consists of the deformable member 21, the two levers 31, 32 the yoke 35 with the hinges 36, 37, and the support elements 38, 39, forms an integral unit.

This embodiment is particularly advantageous when the round table 5, about which a tape scale 1, together with the tensioning device 2, need be fitted, has a free axis 51. In this case, the tape scale 1, together with the tensioning device 2, can axially be pushed over the round table 5. In other cases, it is advantageous when the tensioning device 2 is formed of several, in particular, two parts, as it would be described further below with reference to FIG. 5.

Below, with reference to FIG. 4, it will be described in detail how the action of the actuation member 41 on the deformable member 21 along the operational direction W, which results in deformation of the deformable member 21 parallel of the operational direction W by an amount dH, leads to a predetermined displacement of the lever ends 31*b*, 32*b* by a predetermined amount S in a direction transverse to the operational direction W.

Figure 3:
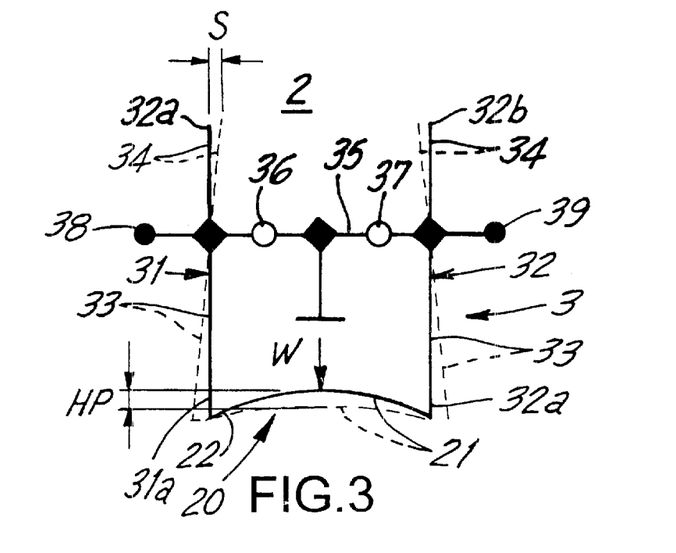
FIG. 3 a schematic view of the tensioning device shown in FIG. 1c at an increased scale.
Figure 4:
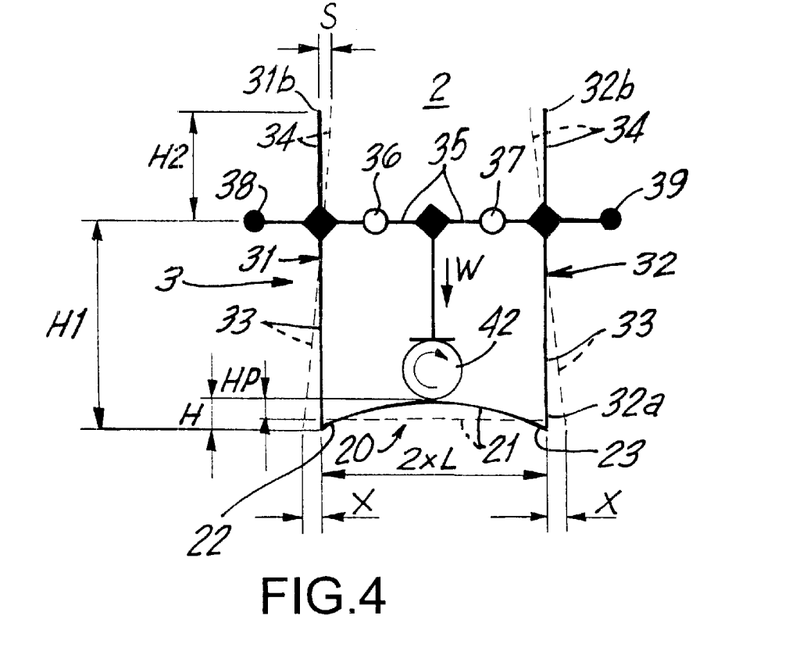
FIG. 4 a schematic view of the tensioning device shown in FIG. 1c at an increased scale illustrating operation of the transmission mechanism.

The tensioning device 2 shown in FIG. 4 is substantially identical to that shown in FIG. 3, differing from that of FIG. 3 in that instead of a longitudinally displaceable actuation member 41, an actuation member 42, which has a shape of an eccentric, is supported by the yoke 35. The functioning of both tensioning device is identical. Thus, the function can be described with reference to FIG. 4, without a detail description of the device 2 shown therein (which has already been described with reference to FIG. 3).

As shown in FIG. 4, the eccentric-shaped actuation member 42 acts on a longitudinal, bulging, elastic, deformable member 21 having a length 2*L in a direction transverse of the operational direction W of the actuation member 42. The eccentric-shaped actuation member 42 acts radially on the deformable member 21, which, dependent on the rotational direction of the eccentric, results in an increase or decrease of the height H of the deformable member 21 by an amount dH. This leads to the change of the length 2*L of the deformable member 21 because it ends 22, 23 are not fixed but rather move in a direction transverse to the operational direction W of the actuation member 42. The amount X of the displacement of the ends 22, 23 of the deformable member 21, which extends in an unloaded condition along an arc, in a direction transverse to the operational direction W (X represents a half a length change of the deformable member (21)) depends on the change dH of the height H of the deformable member 21 and can be determined from an equation:

$$X(dH)=L-\{(-2*L)^2/4+3*dH^2/4\}^{1/2}.$$

Thus, upon the change dH of the height H of the deformable member 21 by 0.1 mm, the both ends 22, 23 of the deformable member 21 are displaced, e.g., by 0.00025 mm in a direction W. Thus, the deformable member 21 causes, on one hand, a shift of a radial force, which acts on the deformable member 21 along the operational direction W, in a direction transverse to the operational direction W and, on the other hand, an increased transmission ratio (in this case in a form of so-called "reduction").

A further reduction is obtained by an appropriate selection of lengths H1 and H2 of the lever arms 33, 34 of both levers 31, 32 which connect the ends 22, 23 of the deformable member 21 with the ends 11, 12 of the tape scale 1. This reduction can be easily determined from the known lever principle.

Thus, a certain change of the positions of both ends 11, 12 of the tape scale 1 (compare FIGS. 1*a*–1*c*) takes place dependent on the change dH of the height H of the deformable member 21, which is caused by a radial action of the eccentric-shaped actuation member 42 on the deformable member 21 resulting in the displacement of the ends 31*b*, 32*b* which are associated with the tape scale 1, of the levers 31, 32 by an amount S in the direction transverse to the operational direction W of the actuation member 42.

The movement of the actuation member 42, which is formed as an eccentric, reduces the height H of the deformable member 21, resulting in the movement of the opposite ends 11, 12 of the tape scale 1 toward each other and, correspondingly, in the tensioning of the tape scale 1. The same tensioning of the tape scale 1 takes place when the actuation member 42 is formed as an adjusting screw or the like.

As it follows from the foregoing discussion, changes of the height H of the deformable member 21 in order of a fraction of a millimeter leads to the displacement of the position of the ends 11, 12 of the tape scale 1 by a distance S in order of a fraction of a micron. Thus, a conversion of a long movement of the actuation member into a substantially smaller displacement of the ends of a tape scale (reduction) is achieved.

As it has been already mentioned above, FIGS. 6*a* and 6*b* show a perspective view of a possible practical embodiment according to the present invention which would be explained based on the tensioning device 2 schematically shown in FIGS. 3–4.

Figure 6A:
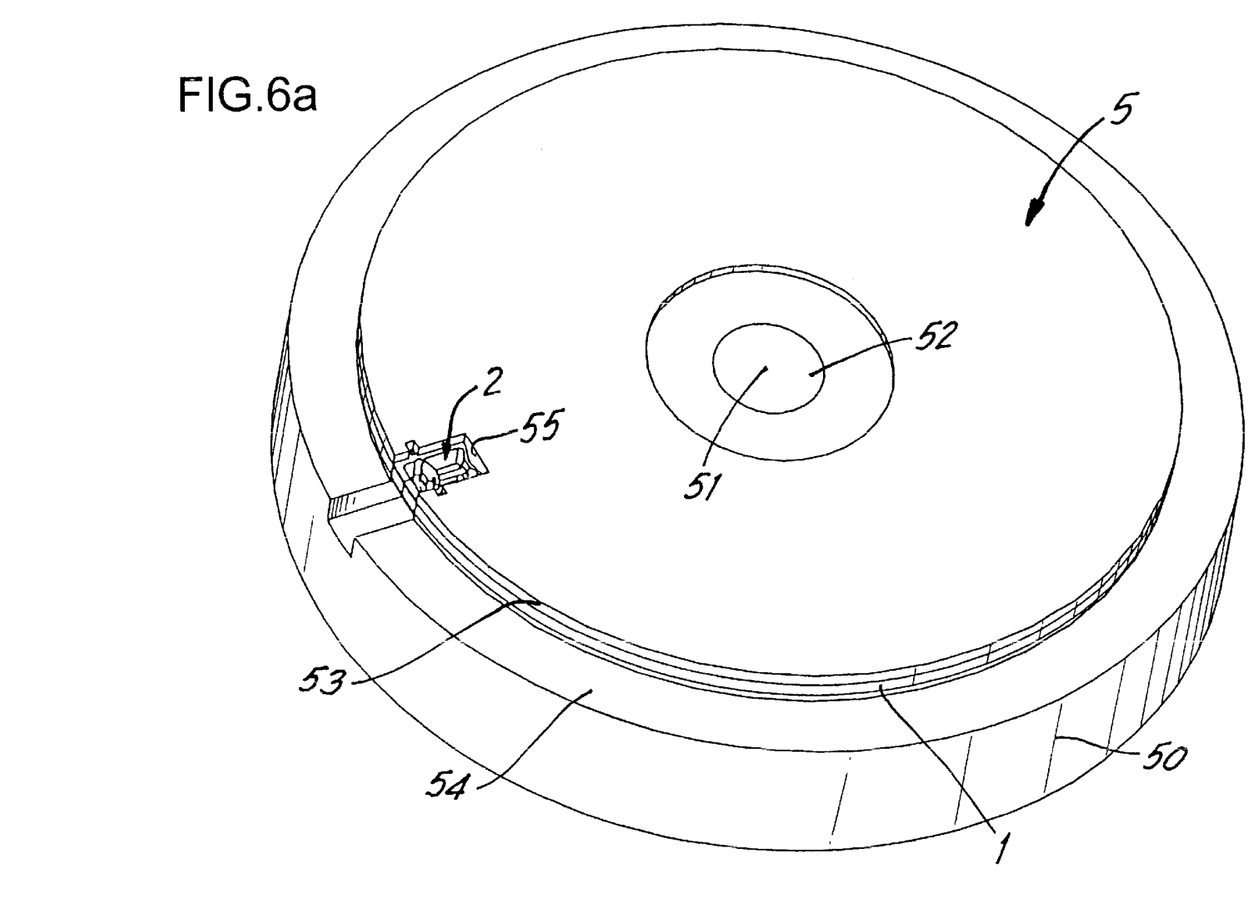
FIG. 6a a perspective view of a preferred embodiment of a tensioning device mounted on a round table.
Figure 6B:
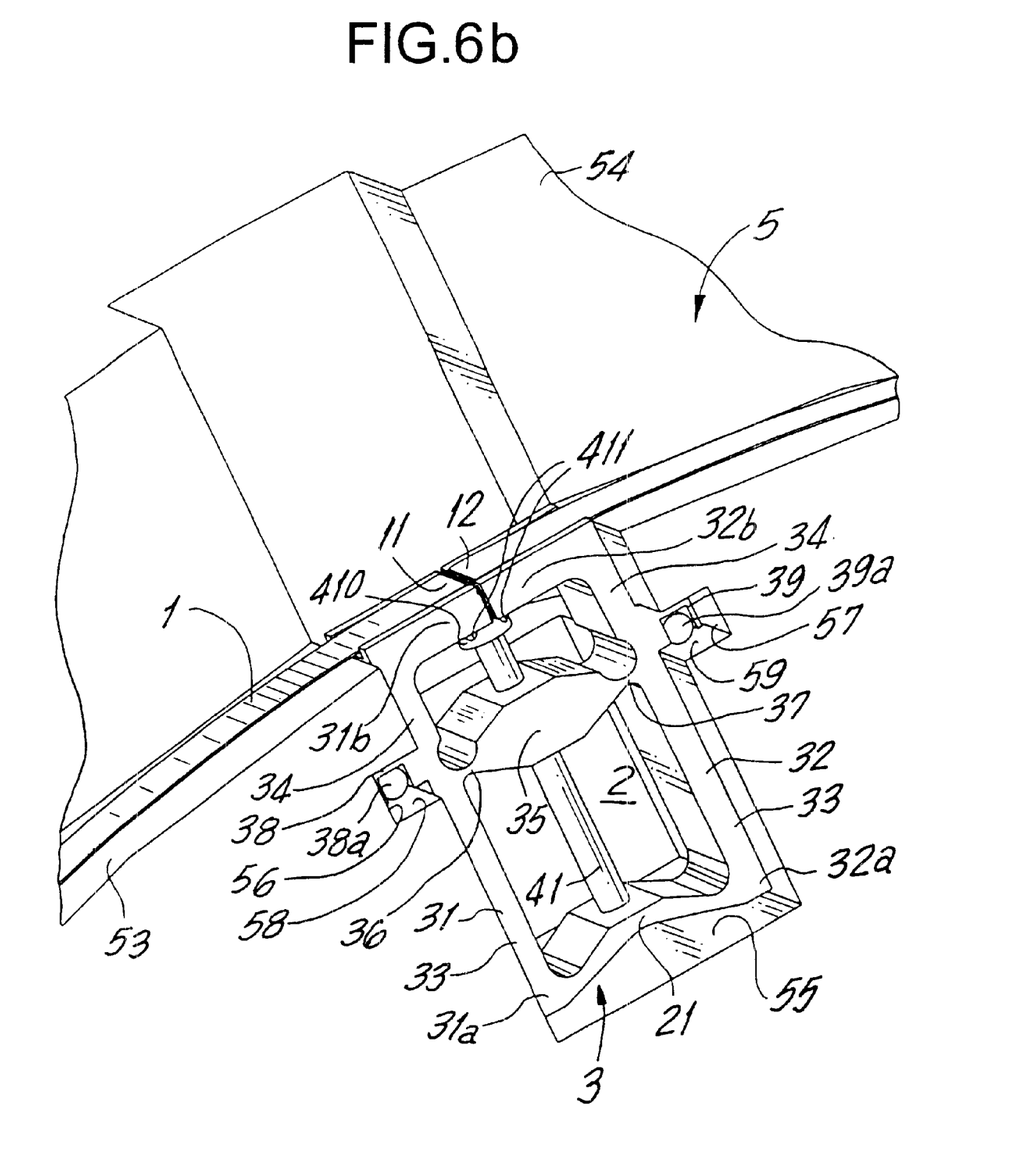

FIGS. 6*a*–6*b* show a tape scale 1 which is placed around a collar 53 provided on an outer surface 50 of a round table having a central bore 52. The ends 11 and 12 of the tape scale 1 are connected with inwardly extending ends 31*b*, 32*b* of two levers 31, 32, as discussed above, which are components of a tensioning device 2 for tensioning the tape scale 1. A shoulder 54 adjoining the table 50 serves for supporting the tensioning device 2.

The tensioning device 2 is formed as a one-piece element and includes a yoke 35 having, at opposite ends thereof, hinges 36, 37 which are formed as flectors. The levers 31, 32 are connected with the yoke 35 via the flectors 36, 37, forming an integral element therewith. The ends 31a, 32a of the levers 31, 32 opposite the ends 31b, 32b, connected with the tape scale 1, are connected with each other by the deformable member 21, which is formed as an elastically deformable, bulging, substantially flat part. The levers 31, 32 are provided, in the region of the hinges 36, 37, with support elements 38, 39, respectively, which are spaced from the hinges 36, 37. The support elements 38, 39 are arranged in side pockets 56, 57 of a recess 55 in which the tensioning device is received. The support elements 38, 39 surround, respectively, cylindrical pins 38a, 39a over which the levers 31, 32 are linearly supported against support surfaces 58, 59 respectively, provided in the round table 5. The cylindrical pins 38a, 39a are inserted into the support elements 38, 39 and are glued thereto. The support surfaces 58, 59 form a support for the tensioning device 2 which is supported against the support surfaces 58, 59 via the support elements 38, 39 and the cylindrical pins 38a, 39a.

The deformable member 21 and the levers 31, 32 form a transmission mechanism 3 with which positions of both ends 11, 12 of the tape scale 1 can be adjusted, in a manner described with reference to FIGS. 3–4, by tensioning the tape scale 1. The deformation of the deformable member 21 is effected with an adjusting screw 41 which extends through an opening in the yoke 35 and has a head 410 provided with side openings 411 accessible to a tool.

FIG. 6b clearly shows a gap between the two ends 11, 12 of the tape scale 1. The width of the gap depends on tensioning of the tape scale 1. Accordingly, the tensioning device 2 should be able to maintain a certain gap between the ends 11, 12, adjusting the positions of the ends 11, 12 so that the ends 11, 12 are not butt-joined with each other.

Figure 6C:
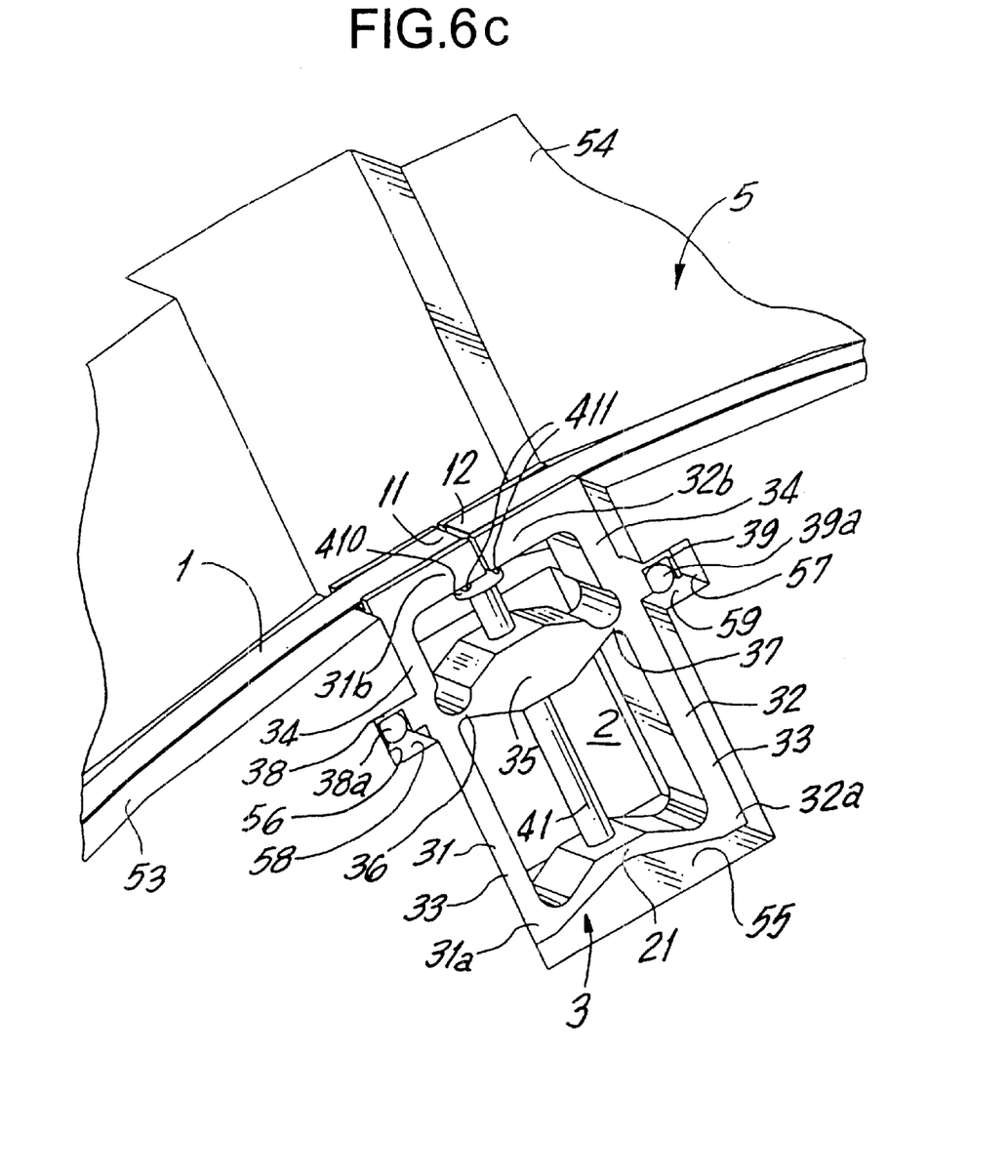
FIG. 6c a perspective view similar to that of FIG. 6b of another embodiment of a tensioning device.

However, the present invention can also be used when the tensioning device provides for butt-joining of the ends of a tape scale as shown in FIG. 6c. Further, the embodiments of the invention shown in FIGS. 6b and 6c can also be used with a tensioning device in which e.g., the flectors 36, 37 are replaced with turning knuckles, in particular in form of a ball and socket joint.

Likewise, the actuation member of the tensioning device can have different forms. In the embodiment shown in FIG. 6b, an adjusting screw is used for deforming the deformable member 21, which screw extends through a threaded bore formed in the yoke 35.

Figure 5:
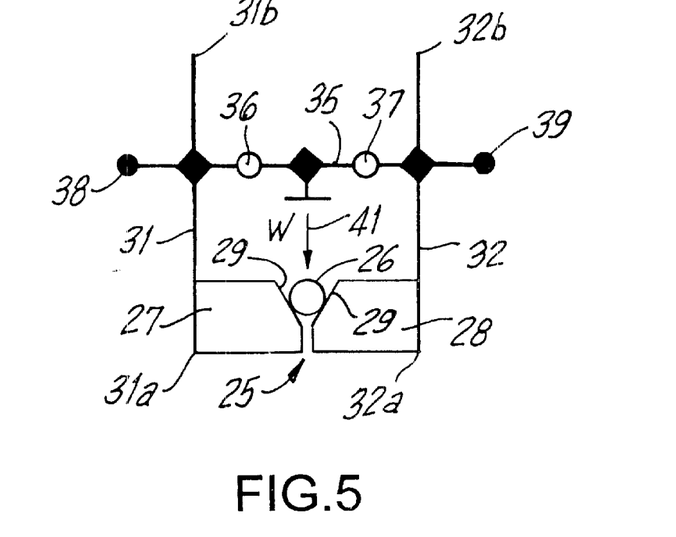
FIG. 5 a schematic view of a modified tensioning device of FIGS. 3–4.

FIG. 5 shows another embodiment of the tensioning device 2 which differs from that shown in an described with reference to FIGS. 3–4. In the tensioning device shown in FIG. 5, instead of the deformable member 21, a wedge mechanism 26, 27, 28 is used as a force transmission device 25. It includes a cylinder 26 arranged between two wedge members 27, 28, with the cylindrical surface of the cylinder 26 engaging the wedge surfaces 29 of the two wedge members 27, 28. A longitudinally displaceable, in a direction W, actuation member 41, which can be formed, e.g., as an adjusting screw, acts on the cylinder 26, causing the displacement of the cylinder in a direction transverse to the cylinder axis.

The movement of the cylinder 26 in the direction W results in the displacement of the wedge members 27, 28 in a direction transverse to the direction W. The wedge members 27, 28 have the ends 31a, 32a of the levers 31, 32 attached thereto, respectively. The opposite ends 31b, 32b are connected, as it has already been described above, to the ends 11, 12 of the tape scale (1) respectively.

The tensioning device 2, which is shown in FIG. 5 functions in the same manner as that described with reference to FIGS. 3–4 except the difference in functioning of the deformable member and the wedge mechanism.

The tensioning device shown in FIG. 5 is particular suitable for applications when the tensioning device is formed of several parts. In this case, e.g., one of the two hinges 36, 37, which are formed, preferably as turning knuckles, can be connected releasably with the yoke 35 with a pin or the like.

With the tensioning device shown in FIG. 5, the mounting of the tape scale and the tensioning device on a round table can be effected so that first, two separate units of the tensioning device of which one, e.g., includes the lever 31, the associated hinge 36, and associated wedge member 27, and another of which includes the second lever 32, the associated hinge 37 together with the yoke 35, and the corresponding wedge member 28, are mounted in the recess 55 of the round table 5 to form the tensioning device.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An angular encoder, comprising
    a tensible tape scale having a scannable graduation and designed for taking circular angular measurements; and
    a tensioning device connected with at least one end of the tape scale for tensioning the tape scale to adjustably position the at least one end, the tensioning device including an actuation member, and a transmission mechanism for connecting the actuation member with at least one end of the tape scale and for changing, in response to operation of the actuation member, a position of the at least one end of the tape scale in accordance with a transmission ratio of the transmission mechanism.

2. An angular encoder asset forth in claim 1, wherein the transmission mechanism is formed as a reduction mechanism for converting a displacement of the actuation member along a first path into a displacement of the at least one end of the tape scale along a second, shorter path.

3. An angular encoder as set forth in claim 1, wherein the transmission mechanism comprises a plurality of mechanical coupling elements.

4. An angular encoder as set forth in claim 1, wherein the actuation member is formed as an eccentric.

5. An angular encoder as set forth in claim 1, wherein the tensioning device provides for butt-joining of the ends of the tape scale.

6. An angular encoder as set forth in claim 1, wherein the tensioning device so positions the at least one end that a gap is formed between the ends of the tape scale.

7. An angular encoder as set forth in claim 1, wherein the tape scale is designed for positioning around a round table, and the tensioning device is designed for positioning in a recess formed in the table.

8. An angular encoder as set forth in claim 1, wherein the tensioning device includes at least one support element supportable against a support surface of a body around which the tape scale is to be positioned.

9. An angular encoder as set forth in claim 1, further comprising a base tape on which the tape scale is placed, and one of a sliding layer and a separating layer provided between the base tape and the tape scale, and wherein the tensioning device is connected only with the tape scale.

10. An angular encoder as set forth in claim 1, wherein the actuation member is formed as a longitudinally displaceable member.

11. An angular encoder as set forth in claim 10 wherein the actuation member is formed as an adjusting screw.

12. An angular encoder as set forth in claim 1, wherein the transmission mechanism comprises a lever having a first arm associated with the actuation member, and a second arm associate with the at least one end of the tape scale and having a length shorter than a length of the first arm.

13. An angular encoder as set forth in claim 12, wherein the transmission mechanism further comprises a flector about which the lever can pivot.

14. An angular encoder as set forth in claim 12, wherein the transmission mechanism further comprises a hinge formed as a turning knuckle about which the lever can pivot.

15. An angular encoder as set forth in claim 1, wherein the transmission mechanism comprises force deflection means acted upon by an actuation member displaceable in a first direction whereby the force deflection means is displaced in a second direction substantially transverse to the first direction, whereupon a position of the at least one end of the tape scale is changed.

16. An angular encoder as set forth in claim 15, wherein a displacement of the force deflection means in the second direction is shorter than a displacement of the actuation member in the first direction.

17. An angular encoder as set forth in claim 15, wherein the force deflection means comprises a wedge mechanism having a member on which the actuation member acts.

18. An angular encoder as set forth in claim 15, wherein the force deflection means comprises a deformable member deformable in a direction transverse to a direction of the actuation member acting on the deformable member.

19. An angular encoder as set forth in claim 15, wherein the transmission mechanism comprises at least one lever for connecting the force deflection means with the at least one end of the tape scale.

20. An angular encoder as set forth in claim 19, wherein the transmission mechanism comprises two levers for connecting the force deflection means with both ends of the tape scale, a yoke for connecting the two levers and provided with the two hinges about which the two levers, respectively, are able to rotate; and wherein the force deflection means, the yoke, the hinges, and the levers form a one-piece unit.

21. An angular encoder as set forth in claim 1, wherein the transmission mechanism connects the actuation member with both ends of the tape scale.

22. An angular encoder as set forth in claim 2, wherein the transmission mechanism comprises two levers for connecting the actuation member with respective ends of the tape scale.

23. An angular encoder as set forth in claim 22, wherein the two levers are formed as separate parts.

24. An angular encoder as set forth in claim 22, wherein the transmission mechanism further comprises a yoke for connecting the two levers and provided with two hinges about which the two levers, respectively, are able to pivot.

25. An angular encoder as set forth in claim 24, wherein the hinges are formed integrally with the yoke.

26. An angular encoder as set forth in claim 25, wherein the yoke, the hinges, and the two levers are formed as a one-piece unit.

27. An angular encoder, comprising a tape scale positionable about a circumferential surface of a support body; and a tensioning device connected with both ends of the tape scale for tensioning same by displacing the ends, the tensioning device including first and second levers connected with the ends at one ends thereof, respectively, an actuation member operationally connected with another ends of the first and second levers for pivoting the levers in opposite directions to move the ends in opposite directions; and two hinges for supporting the two levers for pivotal movement, respectively.

28. An angular encoder as set forth in claim 27, wherein a region of each lever between a second end thereof and a respective hinge forms a first arm, and a region between the respective hinge and the first end thereof forms a second arm shorter than the first arm.

29. An angular encoder as set forth in claim 28, wherein the tensioning device further comprises a deformable member connecting the two levers and deformable upon action thereon by the actuation member, whereby the second ends of the two levers move in opposite directions upon deformation of the actuation member.

30. An angular encoder as set forth in claim 29, wherein the two levers extend parallel to each other, and the deformable member extends transverse to the two levers.

* * * * *